US011445725B2

(12) United States Patent
Bristow

(10) Patent No.: US 11,445,725 B2
(45) Date of Patent: Sep. 20, 2022

(54) HERBICIDAL COMPOSITION COMPRISING MESOTRIONE

(71) Applicant: JIANGSU ROTAM CHEMISTRY CO., LTD, Jiangsu (CN)

(72) Inventor: James Timothy Bristow, Chai Wan (HK)

(73) Assignee: JIANGSU ROTAM CHEMISTRY CO., LTD, Jiangsu (CN)

( * ) Notice: Subject to any disclaimer, the term of this patent is extended or adjusted under 35 U.S.C. 154(b) by 0 days.

(21) Appl. No.: 16/319,212

(22) PCT Filed: Oct. 23, 2017

(86) PCT No.: PCT/CN2017/107249
§ 371 (c)(1),
(2) Date: Jan. 18, 2019

(87) PCT Pub. No.: WO2018/077128
PCT Pub. Date: May 3, 2018

(65) Prior Publication Data
US 2019/0380338 A1    Dec. 19, 2019

(30) Foreign Application Priority Data
Oct. 31, 2016    (GB) ..................................... 1618322

(51) Int. Cl.
| | | |
|---|---|---|
| *A01N 41/10* | (2006.01) | |
| *A01N 25/14* | (2006.01) | |
| *A01N 25/12* | (2006.01) | |
| *A01N 25/22* | (2006.01) | |
| *A01N 25/08* | (2006.01) | |
| *A01N 25/30* | (2006.01) | |

(52) U.S. Cl.
CPC ............. *A01N 41/10* (2013.01); *A01N 25/08* (2013.01); *A01N 25/14* (2013.01); *A01N 25/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,006,158 A | * | 4/1991 | Carter | A01N 35/06 504/309 |
| 2005/0233904 A1 | * | 10/2005 | Hills | A01N 47/36 504/102 |
| 2009/0170702 A1 | * | 7/2009 | Yoshii | A01N 47/36 504/127 |
| 2010/0144527 A1 | | 6/2010 | Patel et al. | |

FOREIGN PATENT DOCUMENTS

| | | | |
|---|---|---|---|
| CN | 101288399 A | | 10/2008 |
| CN | 102726381 A | | 10/2012 |
| CN | 101961023 B | | 4/2013 |
| CN | 105284854 A | | 2/2016 |
| CN | 105557704 A | | 5/2016 |
| EP | 2591672 | * | 5/2013 |
| GB | 2530838 A | | 4/2016 |
| GB | 2532218 A | | 5/2016 |

OTHER PUBLICATIONS

Barchanska, H., et al., "Degradation study of mesotrione and other triketone herbicides on soils and sediments," Journal of Soils and Sediments, vol. 16pp. 125-133 (2016), published online Jul. 3, 2015.*
Lavieille, D. et al., "Effect of a spreading adjuvant on mesotrione photolysis on wax films," Journal of Agricultural and Food Chemistry, vol. 57(2), pp. 9624-9628 (2009).*
Ter Halle, A. et al., "The effect of mixing two herbicides mesotrione and nicosulfuron on their photochemical reactivity on cuticular wax film," Chemosphere, vol. 79(4), pp. 482-487 (2010).*
Machine translation of CN 101961023 (Feb. 2011).*
Transmittal of International Search Report and Written Opinion regarding Application No. PCT/CN2017/107249 dated Jan. 31, 2018.
Combined Search and Examination Report regarding GB priority patent application No. GB1618322.0 dated Feb. 21, 2017.

* cited by examiner

*Primary Examiner* — John Pak
(74) *Attorney, Agent, or Firm* — Dickinson Wright PLLC

(57) ABSTRACT

A solid herbicidal composition is provided, the composition comprising: i) mesotrione; and ii) a base. A method of controlling plant growth using the composition or a diluted form thereof is also disclosed.

12 Claims, No Drawings

HERBICIDAL COMPOSITION COMPRISING MESOTRIONE

CROSS REFERENCE TO RELATED APPLICATIONS

The present disclosure is the national phase of International Application No. PCT/CN2017/107249, titled "HERBICIDAL COMPOSITION COMPRISING MESOTRIONE", filed on Oct. 23, 2017, which claims the priority to GB Patent Application No. 1618322.0, titled "HERBICIDAL COMPOSITION COMPRISING MESOTRIONE", filed with GB Intellectual Property Office on Oct. 31, 2016, the entire contents of which are incorporated herein by reference.

FIELD

The present invention relates to a solid herbicidal composition comprising, in particular to a solid composition comprising meostrione. The present invention further provides a method of controlling weeds at a locus comprising diluting the herbicidal composition of the present invention and applying to the locus a weed controlling amount of the diluted herbicidal composition.

BACKGROUND

Mesotrione (IUPAC name: 2-(4-mesyl-2-nitrobenzoyl) cyclohexane-1,3-dione) is a known herbicidally active compound and has the following chemical structure:

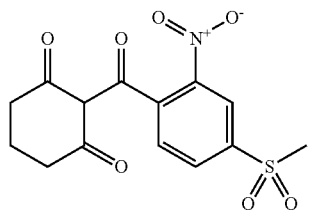 [SMILES: CS(=O)(=O)c1ccc(C(=O)C2C(=O)CCCC2=O)c([N+](=O)[O-])c1]

Methods for preparing mesotrione are known in the art. For example, mesotrione can be prepared as described in U.S. Pat. No. 5,006,158, while its salts or metal chelates can be prepared as described in U.S. Pat. No. 5,912,207.

Mesotrione is a p-hydroxyphenyl pyruvate dioxygenase inhibitor, which ultimately affects carotenoid biosynthesis in the treated plants.

Mesotrione is commercially available in a number of herbicidal compositions.

In a neutral or an acid environment, mesotrione exhibits tautomerism, with the enol form of mesotrione co-existing with mesotrione through tautomeric equilibrium according to the following scheme.

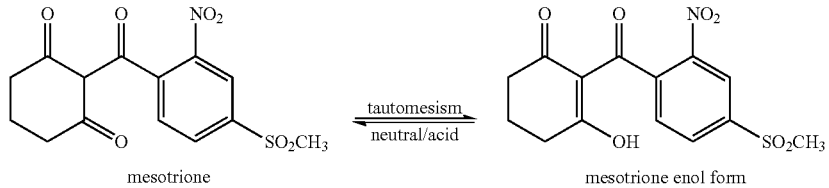 [SMILES: CS(=O)(=O)c1ccc(C(=O)C2C(=O)CCCC2=O)c([N+](=O)[O-])c1 ; CS(=O)(=O)c1ccc(C(=O)C2=C(O)CCCC2=O)c([N+](=O)[O-])c1]

Solid herbicidal compositions comprising mesotrione are known in the art. For example, WO 2008/014185 discloses controlled release granules comprising mesotrione. WO 2007/133522 discloses granules comprising mesotrione in combination with diuron. US 2007/225169 concerns submicron mesotrione compositions, in particular suspension concentrate and suspoemulsion formulations of mesotrione, in which mesotrione is present as particles of less than 1 micron in size. US 2007/225169 discloses forming a millbase comprising mesotrione, acetic acid and copper hydroxide, resulting in mesotrione being present in the final formulation in its chelated form.

It has been discovered that mesotrione, in its acid form, can exhibit relatively poor chemical stability in solid compositions. As a result, WO 2012/12314 suggests using certain specific arene sulfonate condensate surfactants and an acidifying agent to improve the chemical stability of mesotrione in solid compositions.

There is a need for an improved solid composition of mesotrione that exhibits improved stability. It would be advantageous if the composition is simple to form, in particular on a commercial scale, and relies on a minimum number of components.

SUMMARY

The present invention provides a novel solid mesotrione composition in which the chemical stability of the mesotrione active ingredient is significantly improved. This improvement in stability is achieved by the use of a base. It is surprisingly found that the inclusion of a base into the solid composition can significantly reduce the decomposition of the mesotrione in a solid herbicidal composition. The present invention is based, in part, on the surprising discovery that instead of including an acidifying agent, as taught by the prior art, the inclusion of a base can chemically stabilise mesotrione in solid formulations.

Therefore, according to the present invention there is provided in a first aspect a solid herbicidal composition comprising: i) mesotrione; and ii) a base.

The amount of mesotrione in the solid composition is determined by such factors as, for example, the type of the solid formulation, the intended purpose of the composition, for example the target plants to be treated and the manner of application to the locus to be treated, and the presence of other active ingredients in the composition.

Mesotrione may be present in the solid composition in an amount of from 1% to 90% by weight, preferably from 1% to 80 by weight. Preferably, mesotrione is present in the composition in an amount of from 1% to 70% by weight, more preferably from 1% to 60% by weight.

It is known that mesotrione can exist in several crystalline polymorphic forms, for example as disclosed in WO 06/021743 and WO 2011/016018. Any of the polymorphic forms of mesotrione may be used in the solid composition of the present invention. Preferably, mesotrione is present in the thermodynamically stable form 1.

The solid herbicidal composition of the present invention further comprises a base. The solid composition is a concentrate formulation. Prior to use, the composition is diluted and/or dispersed in an aqueous environment. When dispersed and/or diluted in this manner, the mesotrione active ingredient is present in a basic environment in the aqueous dispersion/dilution. The solid composition therefore comprises the base in a sufficient amount which provides a pH higher than 7 when the solid composition is dispersed in and/or diluted with water at a dilution factor of 100, that is 1 g of the composition is diluted with 100 g of water. Preferably the pH the base is present in a sufficient amount to provide basic conditions in the aqueous dispersion/dilution of from 7.5 to 12, more preferably from 8 to 10 at a dilution factor of 100.

The solid composition may comprise any suitable base or combination of bases. Preferred bases for use in the composition of the present invention include those having cations derived from alkali metals or ammonium, in particular sodium, potassium, lithium and ammonium. Preferred bases for use in the composition are those having anions selected from carbonate, phosphate, oxide, hydroxide, acetate and silicate anions, including dimeric, trimeric and polymeric forms thereof such as pyrophosphate, tripolyphosphate, polyphosphate and trisilicate. Examples of preferred bases include but are not limited to anhydrous and hydrated forms of sodium acetate (NaOAc), sodium phosphate ($Na_3PO_4$), sodium hydrogen phosphate ($Na_2HPO_4$), potassium phosphate ($K_3PO_4$), potassium hydrogen phosphate ($K_2HPO_4$), ammonium hydrogen phosphate (($NH_4)_2HPO_4$), sodium carbonate ($Na_2CO_3$), sodium hydrogen carbonate ($NaHCO_3$), potassium carbonate ($K_2CO_3$), potassium hydrogen carbonate ($KHCO_3$), lithium oxide ($Li_2O$), lithium hydroxide (LiOH), lithium carbonate ($Li_2CO_3$), sodium hydroxide (NaOH), lithium phosphate ($Li_3PO_4$), lithium metasilicate ($Li_2SiO_3$), lithium orthosilicate ($Li_4SiO_4$), potassium hydroxide (KOH), sodium silicate ($Na_2SiO_3$), sodium orthosilicate ($Na_4SiO_4$), potassium pyrophosphate ($K_4P_2O_7$), sodium trimetaphosphate (($NaPO_3)_3$), sodium hexametaphosphate (($NaPO_3)_6$), sodium polyphosphate (($NaPO_3$)), sodium pyrophosphate ($Na_4P_2O_7$), sodium tripolyphosphate ($Na_5P_3O_{10}$) and sodium trisilicate ($Na_2Si_3O_7$).

DETAILED DESCRIPTION

In a preferred embodiment, bases comprising a cation of an alkali metal are employed, more preferably sodium ($Na^+$) and potassium ($K^+$) cations.

It is preferred to employ a base containing an anion selected from acetate ($AcO^-$), hydrogen carbonate ($HCO_3^-$), carbonate ($CO_3^{2-}$), hydrogen phosphate ($HPO_4^{2-}$) and phosphate ($PO_4^{3-}$), more preferably carbonate and phosphate.

In many embodiments of the present invention, preferred bases include sodium acetate, sodium carbonate, sodium hydrogen phosphate, sodium phosphate, potassium hydrogen carbonate, potassium carbonate, potassium hydrogen phosphate and potassium phosphate.

The base may be present in the solid composition in an anhydrous form. Alternatively, the base may be present in one or more hydrated forms thereof. Examples of hydrated forms of bases include sodium carbonate monohydrate, disodium hydrogen phosphate hexahydrate, sodium phosphate dodecahydrate, potassium carbonate sesquihydrate, potassium hydrogen phosphate trihydrate and potassium phosphate octahydrate.

Particularly preferred bases for use in the solid composition are sodium carbonate, sodium phosphate, potassium carbonate and potassium phosphate, including hydrated forms thereof. Sodium carbonate, including hydrated forms thereof, is an especially preferred base.

The amount of base present in the solid herbicidal composition can vary, depending upon such factors as the other components in the composition and the diluents to be employed when the composition is diluted and/or dispersed ready for use. Preferably, the base is present in the composition in an amount of from 0.01% w/w to 15% w/w, more preferably from 0.5% w/w to 10% w/w.

Suitable types of formulation for the solid composition of the present invention are known in the art. Suitable solid herbicidal compositions include, for example, dusts; powders, including wettable powders and water soluble powders; and granules, including water dispersible granules, water soluble granules, emulsifiable granules, macrogranules, fine granules, and microgranules. Methods for forming such solid compositions, including extrusion, compaction, fluid bed granulation and spray-dried granulation, are well known in the art.

Preferred formulation types for the composition of the present invention are water-dispersible granules (WG) and wettable powders (WP).

The solid composition of the present invention may comprise one or more further components, for example depending upon the formulation type and the manner of the end use.

For example, the composition may comprise one or more wetting agents. Suitable wetting agents are known in the art. Examples of such wetting agents include, but are not limited to, sodium dodecyl sulfate, alkyl sulfosuccinates, laureates, alkyl sulfates, phosphate esters, acetylenic diols, ethoxyfluornated alcohols, ethoxylated silicones, alkyl phenol ethyoxylates, benzene sulfonates, alkyl-substituted benzene sulfonates, alkyl a-olefin sulfonates, naphthalene sulfonates, alkyl-substituted napthalene sulfonates, condensates of naphthalene sulfonates and alkyl-substituted naphthalene sulfonates with formaldehyde, and alcohol ethoxylates, and mixtures thereof. Sodium dodecyl sulfate (K12) and sodium alkylnaphthalene sulfonate blends (available commercially as MORWET® EFW POWDER) are particularly useful for the composition of the invention.

The solid composition may comprise one or more dispersing agents. Suitable dispersing agents are known in the art. Suitable dispersing agents include, but are not limited to, sodium, calcium and ammonium salts of ligninsulfonates (optionally polyethoxylated); sodium and ammonium salts of maleic anhydride copolymers; sodium salts of condensed phenolsulfonic acid; and naphthalene sulfonate-formaldehyde condensates, such as sodium alkylnaphthalenesulfonate-formaldehyde condensate (commercially available as MORWET® D-425 POWDER). Ligninsulfonates, such as sodium ligninsulfonates (commercially available as REAX 88 B) are particularly useful for the composition of the invention.

The solid composition may comprise one or more antifoaming agent. Suitable antifoaming agents are known in the art. Suitable antifoaming agents include all substances which can normally be used for this purpose in agrochemical compositions. Particularly preferred antifoaming agents include fatty acids, tallow, sodium salts of fatty acids (available commercially as AGNIQUE® SOAP L from BASF), and mixtures of polydimethylsiloxanes and perfluroalkylphosphonic acids, such as the silicone antifoaming agents from GE or Compton.

The solid composition may comprise one or more inert fillers. Suitable inert fillers are known in the art and are available commercially. Suitable fillers include, but are not limited to, natural ground minerals, such as kaolins, aluminas, talc, chalk, quartz, attapulgite, montmorillonite, and diatomaceous earth; and synthetic ground minerals, such as highly dispersed silicic acid, aluminum oxide, silicates, calcium phosphates and calcium hydrogen phosphates. Suitable inert fillers for granules include, for example, crushed and fractionated natural minerals, such as calcite, marble, pumice, sepiolite, and dolomite, or synthetic granules of inorganic and organic ground materials, as well as granules of organic materials, such as sawdust, coconut husks, corn cobs, and tobacco stalks. Suitably, the filler may be present in the solid composition in an amount of from 1 to 90% by weight.

Other formulation ingredients can also be used in the solid compositions of the present invention, such as dyes, drying agents, and the like. These ingredients and their use are known in the art.

As mentioned above, the solid herbicidal composition of the present invention is diluted or dispersed in a diluent prior to use. A weed controlling amount of the diluted product will then be applied to a locus to control the growth of the target plants.

Accordingly, the present invention provides an aqueous diluted composition comprising mesotrione and a base.

As noted above, the diluted composition has a pH greater than 7, more preferably a pH of from 7.5 to 12, more preferably from 8 to 10.

The present invention further provides a method of controlling weeds at a locus comprising applying to the locus a solid composition as hereinbefore described.

Preferably, the method comprises:
(i) diluting a solid composition as hereinbefore described in a diluent; and
(ii) applying to the locus a herbicidally effective amount of the diluted composition.

Water is a particularly preferred diluent.

In a further aspect, the present invention provides the use of a composition as hereinbefore described in the control of plant growth.

The application rate of the composition to the locus will vary and will depend on such factors as the type of weed being targeted, the type of crop plant, soil type, the season, the climate, and soil ecology. For a given set of conditions, the application rate of mesotrione can readily be determined by routine trials. In many embodiments, the application rate of mesotrione is from 10 to 1000 grams per hectare (g/ha), preferably from 20 to 800 g/ha, more preferably from 30 to 700 g/ha, still more preferably from 50 to 500 g/ha.

The diluted herbicidal composition may be applied to the locus as a pre-emergence application, that is before the majority of the target weeds emerge from the soil, and/or as a post-emergence application, that is after the majority of the target weeds emerge from the soil.

The diluted herbicidal composition may be applied once or a plurality of times, for example two, three or four times, to the locus being treated.

As described above, the presence of a base in a solid composition comprising mesotrione has been found to significantly improve the stability of the mesotrione active ingredient.

Accordingly, in a further aspect, the present invention provides the use of a base to increase the stability of mesotrione in a solid, mesotrione-containing composition.

The term "herbicide" as used herein, refers to a compound that exhibits activity in the control of the growth of plants.

The term "herbicidally effective amount" as used herein, refers to the quantity of such a compound or combination of such compounds that is capable of producing a controlling effect on the growth of plants. A controlling effect includes all deviations from the natural development and growth of the plant, including, for example, killing the plant, retardation of one or more aspects of the development and growth of the plant, leaf burn, albinism, dwarfing and the like.

The term "plants" as used herein refers to all physical parts of a plant, including shoots, leaves, needles, stalks, stems, fruit bodies, fruits, seeds, roots, tubers and rhizomes.

Throughout the description and claims of this specification, the words "comprise" and variations of the words, for example "comprising" and "comprises", mean "including but not limited to", and do not exclude other moieties, additives, components, integers or steps. Moreover the singular encompasses the plural unless the context otherwise requires, in particular, where the indefinite article is used, the specification is to be understood as contemplating plurality as well as singularity, unless the context requires otherwise.

Preferred features of each aspect of the invention may be as described in connection with any of the other aspects. Other features of the invention will become apparent from the following examples. Generally speaking the invention extends to any novel one, or any novel combination, of the features disclosed in this specification including any accompanying claims. Thus features, integers, characteristics, compounds, chemical moieties or groups described in conjunction with a particular aspect, embodiment or example of the invention are to be understood to be applicable to any other aspect, embodiment or example described herein unless incompatible therewith. Moreover unless stated otherwise, any feature disclosed herein may be replaced by an alternative feature serving the same or a similar purpose.

As used herein, the term "about," when used in connection with a numerical amount or range, means somewhat more or somewhat less than the stated numerical amount or range, to a deviation of ±10% of the stated numerical amount or endpoint of the range.

"Locus," as used herein, refers to the place on which the plants are growing, the place on which the plant propagation materials of the plants are sown or the place on which the plant propagation materials of the plants will be sown.

All percentages are given in weight % unless otherwise indicated.

Embodiments of the present invention will now be described by way of the following examples which are provided for illustrative purposes only and are not intended to limit the scope of the disclosure.

EXAMPLES

Example 1—Water Dispersible Granule (WG) Formulation

A water dispersible granule (WG) composition according to the present invention was prepared as follows:

The components listed in Table 1 below were mixed, blended and milled in a high-speed rotary mill. Sufficient water was added to obtain an extrudable paste. The paste was extruded through a die or screen to form an extrudate. The wet extrudate was dried at 70° C. in a vacuum oven and then sifted through 0.71 mm to 2 mm screens to obtain the product granules.

TABLE 1

| Component | Amount (%) | Function |
| --- | --- | --- |
| Mesotrione | 45 | Active compound |
| Sodium alkylnaphthalene sulfonate and anionic surfactant (MORWET ® EFW POWDER) | 2 | Wetting agent |
| Sodium lignosulfonate (REAX 88 B) | 10 | Dispersing agent |
| Sodium carbonate ($Na_2CO_3$) | 8 | Base |
| Fatty acids, tallow, sodium salts(AGNIQUE ® SOAP L) | 0.5 | Antifoaming agent |
| Talc powder | Balance to 100 | Filler |

Example 2—Water Dispersible Granule (WG) Formulation

A water dispersible granule (WG) composition according to the present invention was prepared as follows:

All the components listed in Table 2 below were mixed, blended and milled in a high-speed rotary mill. Sufficient water was added to obtain an extrudable paste. The paste was extruded through a die or screen to form an extrudate. The wet extrudate was dried at 70° C. in a vacuum oven and then sifted through 0.71 mm to 2 mm screens to obtain the product granules.

TABLE 2

| Component | Amount (%) | Function |
| --- | --- | --- |
| Mesotrione | 60 | Active compound |
| Sodium alkylnaphthalene sulfonate and anionic surfactant (MORWET ® EFW POWDER) | 2 | Wetting agent |
| Sodium lignosulfonate (REAX 88 B) | 10 | Dispersing agent |
| Sodium acetate (NaOAc) | 8 | Base |
| Fatty acids, tallow, sodium salts(AGNIQUE ® SOAP L) | 1 | Antifoaming agent |
| Talc powder | Balance to 100 | Filler |

Example 3—Water Dispersible Granule (WG) Formulation

A water dispersible granule (WG) composition according to the present invention was prepared as follows:

All the components listed in Table 3 below were mixed, blended and milled in a high-speed rotary mill. Sufficient water was added to obtain an extrudable paste. The paste was extruded through a die or screen to form an extrudate. The wet extrudate was dried at 70° C. in a vacuum oven and then sifted through 0.71 mm to 2 mm screens to obtain the product granules.

TABLE 3

| Component | Amount (%) | Function |
| --- | --- | --- |
| Mesotrione | 20 | Active compound |
| Sodium alkylnaphthalene sulfonate and anionic surfactant (MORWET ® EFW POWDER) | 2 | Wetting agent |
| Sodium lignosulfonate (REAX 88 B) | 10 | Dispersing agent |
| Potassium hydrogen carbonate ($KHCO_3$) | 8 | Base |
| Fatty acids, tallow, sodium salts(AGNIQUE ® SOAP L) | 0.5 | Antifoaming agent |
| Kaolin | Balance to 100 | Filler |

Example 4—Wettable Powder (WP) Formulation

A wettable powder (WP) composition according to the present invention was prepared as follows:

The components listed in Table 4 below were combined and mixed thoroughly.

TABLE 4

| Component | Amount (%) | Function |
| --- | --- | --- |
| Mesotrione | 45 | Active compound |
| Sodium lignosulfonate (REAX 88 B) | 8 | Dispersing agent |
| Sodium dodecyl sulfate (K12) | 3 | Wetting agent |
| Sodium carbonate ($Na_2CO_3$) | 8 | Base |
| Fatty acids, tallow, sodium salts(AGNIQUE ® SOAP L) | 1 | Antifoaming agent |
| Kaolin | Balance to 100 | Filler |

Example 5—Water Dispersible Granule (WG) Formulation

A water dispersible granule (WG) composition according to the present invention was prepared as follows:

All the components listed in Table 5 below were mixed, blended and milled in a high-speed rotary mill. Sufficient water was added to obtain an extrudable paste. The paste was extruded through a die or screen to form an extrudate. The wet extrudate was dried at 70° C. in a vacuum oven and then sifted through 0.71 mm to 2 mm screens to obtain the product granules.

TABLE 5

| Component | Amount (%) | Function |
| --- | --- | --- |
| Mesotrione | 5 | Active compound |
| Anhydrous sodium sulfate | 30 | Filler |
| Sodium alkylnaphthalene sulfonate ((MORWET ® IP) | 1 | Wetting agent |
| Calcium bentonite | 57 | Filler |
| Sodium alkylnaphthalenesulfonate, formaldehyde condensate (MORWET ® D-425 POWDER) | 5 | Dispersing agent |
| Sodium carbonate ($Na_2CO_3$) | 2 | Base |

Comparative Example A—Water Dispersible Granule (WG) Formulation

For comparison purposes, a water dispersible granule (WG) composition without a base was prepared as follows:

All the components listed in Table 6 below were mixed, blended and milled in a high-speed rotary mill. Sufficient water was added to obtain an extrudable paste. The paste was extruded through a die or screen to form an extrudate. The wet extrudate was dried at 70° C. in a vacuum oven and then sifted through 0.71 mm to 2 mm screens to obtain the product granules.

TABLE 6

| Component | Amount (%) | Function |
|---|---|---|
| Mesotrione | 45 | Active compound |
| Sodium alkylnaphthalene sulfonate and anionic surfactant (MORWET ® EFW POWDER) | 2 | Wetting agent |
| Sodium lignosulfonate (REAX 88 B) | 10 | Dispersing agent |
| Fatty acids, tallow, sodium salts(AGNIQUE ® SOAP L) | 0.5 | Antifoaming agent |
| Talc powder | Balance to 100 | Filler |

Comparative Example B—Wettable Powder (WP) Formulation

For comparison purposes, a wettable powder (WP) formulation without a base was prepared as follows:
The components listed in Table 7 below were combined and mixed thoroughly.

TABLE 7

| Component | Amount (%) | Function |
|---|---|---|
| Mesotrione | 45 | Active compound |
| Sodium lignosulfonate (REAX 88 B) | 8 | Dispersing agent |
| Sodium dodecyl sulfate (K12) | 3 | Wetting agent |
| Fatty acids, tallow, sodium salts(AGNIQUE ® SOAP L) | 1 | Antifoaming agent |
| Kaolin | Balance to 100 | Filler |

Comparative Example C—Water Dispersible Granule (WG) Formulation

For comparison purposes, a water dispersible granule (WG) formulation without a base and with an acidifying agent, following the general teaching of WO 2012/123314, was prepared as follows:
All the components listed in Table 8 below were mixed, blended and milled in a high-speed rotary mill. Sufficient water was added to obtain an extrudable paste. The paste was extruded through a die or screen to form an extrudate. The wet extrudate was dried at 70° C. in a vacuum oven and then sifted through 0.71 mm to 2 mm screens to obtain the product granules.

TABLE 8

| Component | Amount (%) | Function |
|---|---|---|
| Mesotrione, | 5 | Active compound |
| Anhydrous sodium sulfate | 30 | Filler |

TABLE 8-continued

| Component | Amount (%) | Function |
|---|---|---|
| Sodium alkylnaphthalene sulfonate ((MORWET ® IP) | 1 | Wetting agent |
| Calcium bentonite | 57 | Filler |
| Sodium alkylnaphthalenesulfonate, formaldehyde condensate (MORWET ® D-425 POWDER) | 5 | Dispersing agent |
| Citric Acid | 2 | Acidifying agent |

Stability Tests

The formulations prepared in the preceding examples and comparative examples were stored in a thermostatic oven at 54° C. for the time period indicated in Table 9 below. The amount of mesotrione in the compositions both before and after the storage was quantitatively determined by liquid chromatography.

The decomposition rate of mesotrione in each composition was calculated from the following formula to evaluate the change with time.

Decomposition rate(%)={$(X-Y)/X$}×100

X: mesotrione content (%) immediately after preparation

Y: mesotrione content (%) after storage

TABLE 9

| Example | Amount of mesotrione before storage (%) | Amount of mesotrione after 14 days (%) | Amount of mesotrione after 30 days (%) | Decomposition rate of mesotrione after 14 days (%) | Decomposition rate of mesotrione after 30 days (%) |
|---|---|---|---|---|---|
| 1 | 45.00 | 44.50 | 44.00 | 1.10 | 2.20 |
| 2 | 60.10 | 59.10 | 58.50 | 1.70 | 2.50 |
| 3 | 20.00 | 19.70 | 19.30 | 1.50 | 3.50 |
| 4 | 45.30 | 44.50 | 43.80 | 1.80 | 3.30 |
| 5 | 5.00 | 4.96 | 4.85 | 0.80 | 3.00 |
| A | 45.10 | 38.00 | 35.10 | 15.70 | 22.20 |
| B | 45.20 | 37.20 | 35.20 | 17.80 | 22.20 |
| C | 5.00 | 4.86 | 4.55 | 2.80 | 9.00 |

The results set out in Table 9 show that mesotrione in the compositions of the present invention is significantly more stable than those of the comparative compositions. In particular, these results indicate that the presence of a base in the solid compositions significantly reduces the decomposition of mesotrione in the solid composition, compared with solid compositions without a base present or with an acidifying agent.

The invention claimed is:

1. A solid herbicidal composition comprising: i) mesotrione as the only active ingredient; and ii) a base; wherein the composition does not comprise an acidifying agent;
   the base is present in the composition in an amount sufficient to provide a pH of from 7.5 to 12 at a dilution factor of 100 in water;
   the base is present in the composition in an amount of from 0.5 to 10% by weight;
   the base is selected from sodium acetate, sodium carbonate, sodium hydrogen phosphate, sodium phosphate, potassium hydrogen carbonate, potassium carbonate, potassium hydrogen phosphate and potassium phosphate; and the solid herbicidal composition further comprises one or more other components selected from wetting agent, dispersing agent, antifoaming agent and inert filler.

2. The composition according to claim 1, wherein mesotrione is present in the composition in an amount of from 1 to 80% by weight.

3. The composition according to claim 2, wherein mesotrione is present in the composition in an amount of from 1 to 60% by weight.

4. The composition according to claim 1, wherein the base is present in the composition in an amount sufficient to provide a pH of from 8 to 10 at a dilution factor of 100 in water.

5. The composition according to claim 1, wherein the base is selected from sodium carbonate, sodium phosphate, potassium carbonate and potassium phosphate.

6. The composition according to claim 5, wherein the base comprises sodium carbonate.

7. The composition according to claim 1, wherein the composition is a dust, a powder or granules.

8. The composition according to claim 7, wherein the composition is water-dispersible granules (WG) or a wettable powder (WP).

9. A method of controlling plant growth at a locus comprising applying to the locus a solid composition according to claim 1.

10. The method according to claim 9, comprising:
(i) diluting a solid composition according to claim 1 in a diluent; and
(ii) applying to the locus a herbicidally effective amount of the diluted composition.

11. The method according to claim 10, wherein the diluent is water.

12. A method for increasing the stability of mesotrione in a solid, mesotrione-containing composition, comprising applying a base to the solid, mesotrione-containing composition, wherein the composition comprises mesotrione as the only active ingredient, and the composition does not comprise an acidifying agent;

the base is present in the composition in an amount sufficient to provide a pH of from 7.5 to 12 at a dilution factor of 100 in water;

the base is present in the composition in an amount of from 0.5 to 10% by weight;

the base is selected from sodium acetate, sodium carbonate, sodium hydrogen phosphate, sodium phosphate, potassium hydrogen carbonate, potassium carbonate, potassium hydrogen phosphate and potassium phosphate; and the composition further comprises one or more other components selected from wetting agent, dispersing agent, antifoaming agent and inert filler.

* * * * *